United States Patent
Klingels et al.

(10) Patent No.: US 9,664,141 B2
(45) Date of Patent: May 30, 2017

(54) THRUST DEFLECTING DEVICE AND AIRCRAFT ENGINE

(71) Applicant: MTU Aero Engines AG, Munich (DE)

(72) Inventors: Hermann Klingels, Dachau (DE); Stephan Klaen, Berlin (DE); Christian Scherer, Roehrmoos (DE); Uwe Vogel, Munich (DE)

(73) Assignee: MTU Aero Engines AG, Munich (DE)

( * ) Notice: Subject to any disclaimer, the term of this patent is extended or adjusted under 35 U.S.C. 154(b) by 239 days.

(21) Appl. No.: 14/299,727

(22) Filed: Jun. 9, 2014

(65) Prior Publication Data

US 2015/0226155 A1    Aug. 13, 2015

(30) Foreign Application Priority Data

Jun. 12, 2013 (EP) .................................... 13171602
Apr. 2, 2014 (EP) .................................... 14163111

(51) Int. Cl.
| | |
|---|---|
| *B64D 33/04* | (2006.01) |
| *F02K 1/00* | (2006.01) |
| *F02K 1/12* | (2006.01) |
| *F02K 1/80* | (2006.01) |

(52) U.S. Cl.
CPC .............. *F02K 1/008* (2013.01); *B64D 33/04* (2013.01); *F02K 1/006* (2013.01); *F02K 1/1207* (2013.01); *F02K 1/80* (2013.01); *F05D 2250/42* (2013.01); *F05D 2260/50* (2013.01); *F05D 2260/56* (2013.01); *F05D 2260/57* (2013.01)

(58) Field of Classification Search
CPC .......... B64C 29/00; B64C 15/00; B64C 15/02
USPC ................................................... 244/15, 12.5
See application file for complete search history.

(56) References Cited

U.S. PATENT DOCUMENTS

| | | | | |
|---|---|---|---|---|
| 4,274,593 A | | 6/1981 | Joubert et al. | |
| 4,587,806 A | * | 5/1986 | Madden | F02K 1/006 239/265.37 |
| 4,798,328 A | * | 1/1989 | Thayer | F02K 1/002 239/1 |
| 4,836,451 A | * | 6/1989 | Herrick | F02K 1/008 239/265.27 |
| 4,848,664 A | * | 7/1989 | Thayer | F02K 1/008 239/265.29 |
| 4,978,071 A | * | 12/1990 | MacLean | F02K 1/006 239/265.19 |
| 5,687,907 A | * | 11/1997 | Holden | B64C 15/02 239/265.35 |
| 5,769,317 A | * | 6/1998 | Sokhey | B64C 15/02 239/1 |

(Continued)

FOREIGN PATENT DOCUMENTS

| | | |
|---|---|---|
| DE | 44 26 195 | 1/1996 |
| DE | 10 2006 031 625 | 3/2007 |

*Primary Examiner* — Justin Benedik
(74) *Attorney, Agent, or Firm* — Davidson, Davidson & Kappel, LLC

(57) ABSTRACT

A thrust deflecting device for deflecting a thrust stream is disclosed, which includes a flap system having a plurality of deflecting flaps, each of which is pivotable around its yaw axis, the flap system being situated between parallel control surfaces such as baffle plates which, together with the flap system, form a box structure, which is pivotable around a pivot axis running in the direction of the transverse axis for the purpose of deflecting the thrust stream in the pitch direction, an aircraft engine also being disclosed.

9 Claims, 4 Drawing Sheets

(56) References Cited

U.S. PATENT DOCUMENTS

| | | | |
|---|---|---|---|
| 6,318,668 B1* | 11/2001 | Ulanoski | B64C 29/0058 239/265.19 |
| 2007/0095972 A1* | 5/2007 | Buffenoir | B64C 15/02 244/15 |

* cited by examiner

THRUST DEFLECTING DEVICE AND AIRCRAFT ENGINE

This claims the benefit of European patent application EP14163111.9, filed Apr. 2, 2014 and hereby incorporated by reference herein.

The present invention relates to a thrust deflecting.

BACKGROUND

Aircraft engines in the military sector regularly have a thrust deflecting device for increasing a flight maneuverability, which reverses a thrust stream in the pitch direction and yaw direction. An exemplary thrust deflecting device is shown in U.S. Pat. No. 4,978,071 A. This thrust deflecting device has a housing for the transition from a round outlet cross section to a rectangular outlet cross section. To deflect the thrust stream in the pitch direction and the yaw direction, the thrust deflecting device has two pairs of side flaps situated orthogonally with respect to each other. Similar thrust deflecting devices are illustrated in U.S. Pat. No. 4,836,451 A, U.S. Pat. No. 5,687,907 A and U.S. Pat. No. 4,848,664 A, in which a thrust stream is also deflected in the pitch direction or the yaw direction with the aid of lateral side flap pairs situated orthogonally with respect to each other. A device for controlling the yaw of a nozzle having a rectangular outlet cross section is furthermore known from DE 10 2006 031 625 A1. A thrust deflecting device is known from U.S. Pat. No. 5,769,317 A, in which a deflection of a thrust stream in the pitch direction takes place by pivoting a nozzle around a transverse axis, and a deflection of the thrust stream in the yaw direction takes place with the aid of a vertical flap pair extending downstream from the nozzle. The disadvantage of these known thrust deflecting devices is a complex mechanical design for activating and moving the flap pairs and the nozzle.

SUMMARY OF THE INVENTION

It is an object of the present invention to provide a thrust deflecting device which eliminates the aforementioned disadvantage and facilitates a deflection of a thrust stream in the pitch and yaw direction using a simplified design. The object of the present invention is also to provide an aircraft engine having a thrust deflecting device of this type.

The present invention provides a thrust deflecting device for deflecting a thrust stream of an aircraft engine has a housing, preferably for the transition from a circular cross section to an angular outlet cross section, and a flap system which includes a plurality of deflecting flaps, each of which is pivotable around its yaw axis which extends orthogonally with respect to the transverse axis of the thrust deflecting device. According to the present invention, the flap system is situated between two parallel control surfaces such as baffle plates which extend downstream from the housing and which, together with the flap system, are pivotable around a pivot axis running in the direction of the transverse axis for the purpose of deflecting the thrust stream in the pitch direction.

Situating the flap system between the baffle plates extending in the transverse direction of the thrust deflecting device creates a box-like structure, which facilitates a vectorization around the pitch axis, due to its pivotability in the pitch direction. A vectorization around the yaw axis takes place with the aid of the deflecting flaps of the flap system, which are pivotable around their yaw axes. An effective thrust vectorization using a simplified design compared to that of the prior art is thus provided with the aid of the thrust deflecting device according to the present invention.

The deflecting flaps are preferably evenly distributed and situated on both sides of a longitudinal axis of the thrust deflecting device, the deflecting flaps on one side being pivotable in the opposite direction from the deflecting flaps on the other side. Due to the adjustment in opposite directions, outlet partial cross sections which are delimited by adjacent deflecting flaps may be changed in such a way that the flap system not only facilitates a deflection of the thrust stream in the yaw direction but also a planar adjustment of the thrust stream.

An industrially robust design of the deflecting flaps may be achieved in that this takes place with the aid of a translational movement of an actuator, for example in the longitudinal direction of the thrust deflecting device.

The sturdiness of the design and thus of the thrust deflecting device may be increased with little complexity if an adjustment of the deflecting flaps in the same direction for the purpose of deflecting the thrust stream in the yaw direction takes place via a translational transverse movement of an actuating housing accommodating the actuator. Only two straight movements, which are preferably perpendicular to each other, are thus superimposed for the purpose of deflecting the thrust stream in the yaw direction and for planar adjustment.

In one preferred, industrially robust exemplary embodiment, the actuator is linked to a sliding plate which is movably supported in the actuating housing in the longitudinal direction and which is operatively connected to each of the deflecting flaps on one side via a lever mechanism, the lever mechanisms each including a pivot body which is pivotable around a vertical axis extending in parallel to the yaw axis of the deflecting flaps and from which joint rods extend to each of the deflecting flaps. A design of this type facilitates a deflection of the thrust stream in the yaw direction as well as a planar adjustment using a minimum number of parts.

To minimize the forces acting upon the joint rods for the purpose of adjusting the deflecting flaps, and to achieve a sensitive adjustment of the deflecting flaps using low forces, the joint rods may be linked to arms which extend downstream from a front area of the deflecting flaps.

An aircraft engine according to the present invention has a thrust deflecting device according to the present invention, including an effective combination of thrust vectorization and planar adjustment in an angular nozzle having a large aspect ratio.

Other advantageous exemplary embodiments of the present invention are the subject matter of additional subclaims.

BRIEF DESCRIPTION OF THE DRAWINGS

One preferred exemplary embodiment of the present invention is explained in greater detail below on the basis of schematic representations.

DETAILED DESCRIPTION

Figure 1:
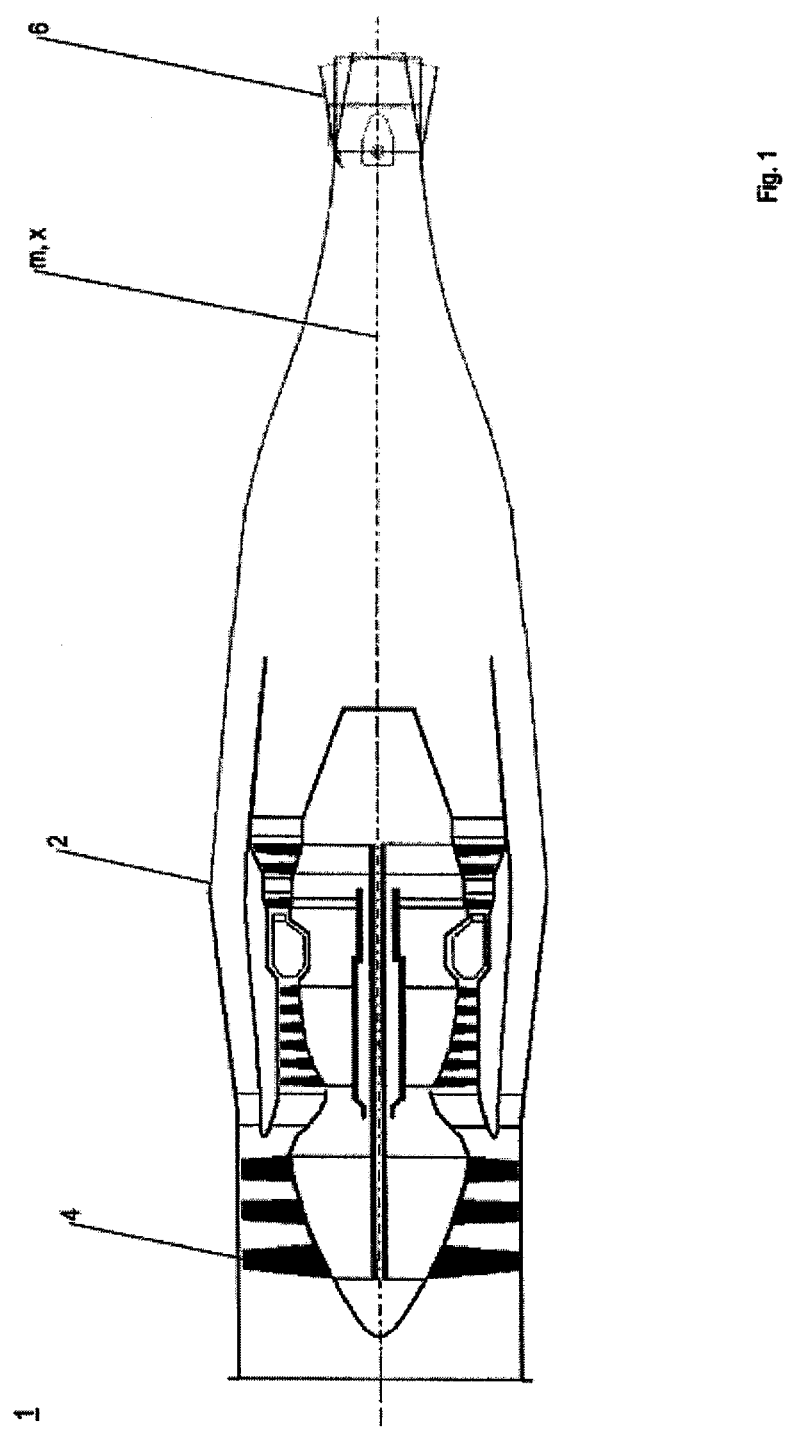
FIG. 1 shows a longitudinal section of an aircraft engine according to the present invention.

According to the representation in FIG. 1, an aircraft engine 1 according to the present invention has a jacket housing 2, in which, for example, a fan 4 is situated on the inlet side, and a thrust deflecting device 6 according to the present invention for deflecting a thrust stream exiting aircraft engine 1 is situated on the outlet side. Thrust deflecting device 6 is located on an engine center axis m with its longitudinal axis x and is actuated with the aid of a motor drive, which is not shown.

Figure 2:
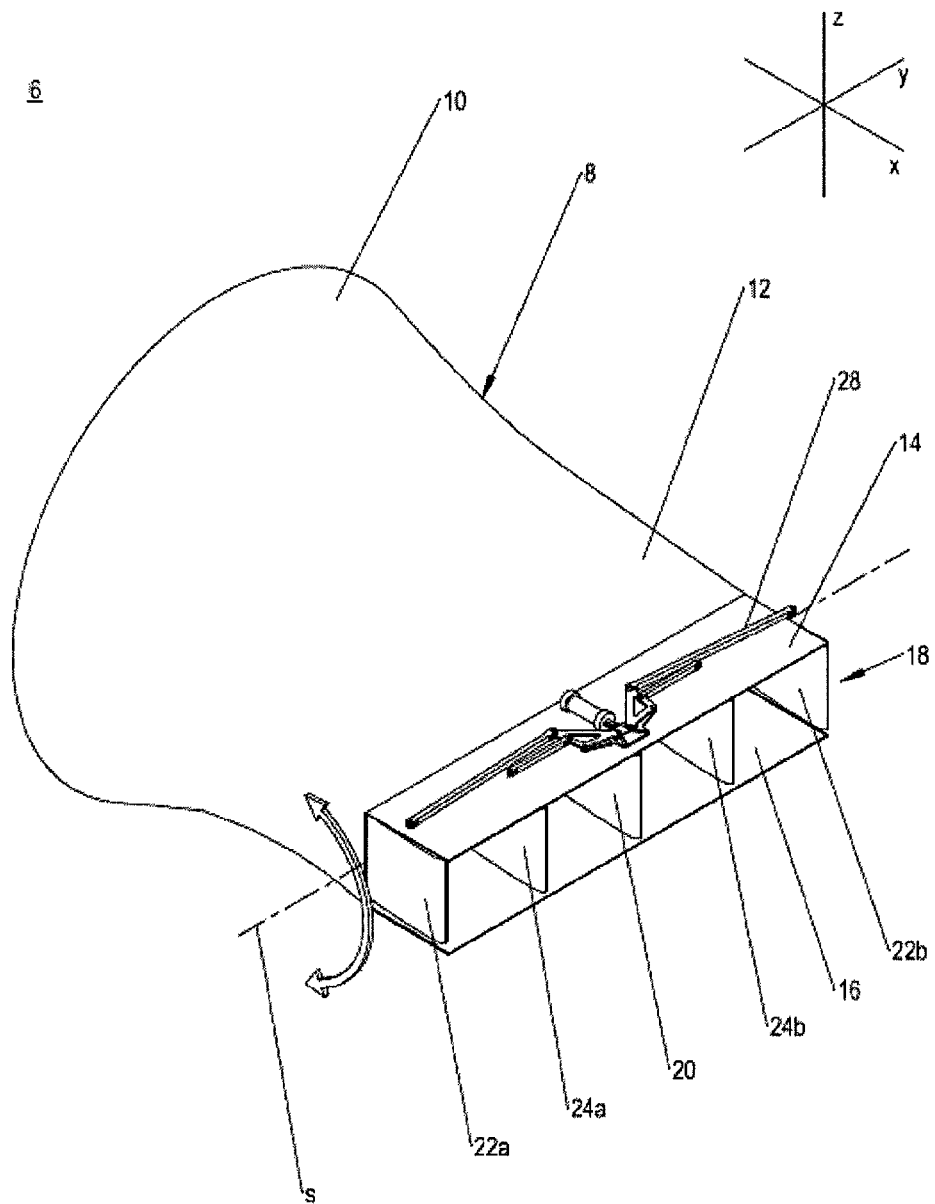
FIG. 2 shows a perspective detailed representation of a thrust deflecting device according to the present invention.

According to the individual representation in FIG. 2, the thrust deflecting device has a housing 8, including a front cylindrical housing section 10 and a rear rectangular housing section 12. Thrust deflecting device 6 is fastened to jacket housing 2 with the aid of front housing section 10, so that the thrust stream entering housing 8 is transferred from a circular cross section to an angular outlet cross section and, in particular, to a rectangular outlet cross section. Rear housing section 12 has a larger extension in the direction of a transverse axis y of thrust deflecting device 6 than in the direction of a yaw axis z of thrust deflecting device 6, so that rectangular or rear housing section 12 has a recumbent design in the horizontal orientation of the aircraft engine.

In addition, thrust deflecting device 6 has two parallel baffle plates 14, 16. Baffle plates 14, 16 extend downstream from rear housing section 12 and have the same extension in the transverse direction as rear housing section 12. Baffle plates 14, 16 are spaced a distance apart in the vertical direction of thrust deflecting device 6.

Thrust deflecting device 6 furthermore has a flap system 18. Flap system 18 is situated between baffle plates 14, 16 and, together with them, forms a box-like structure or rectangular nozzle. In the illustrated exemplary embodiment, flap system 18 has five deflecting flaps 20, 22a, 22b, 24a, 24b, which are spaced evenly apart in the transverse direction. Deflecting flaps 20, 22a, 22b, 24a, 24b preferably do not project beyond baffle plates 14, 16 in the longitudinal direction but are situated entirely therebetween.

Figure 3:
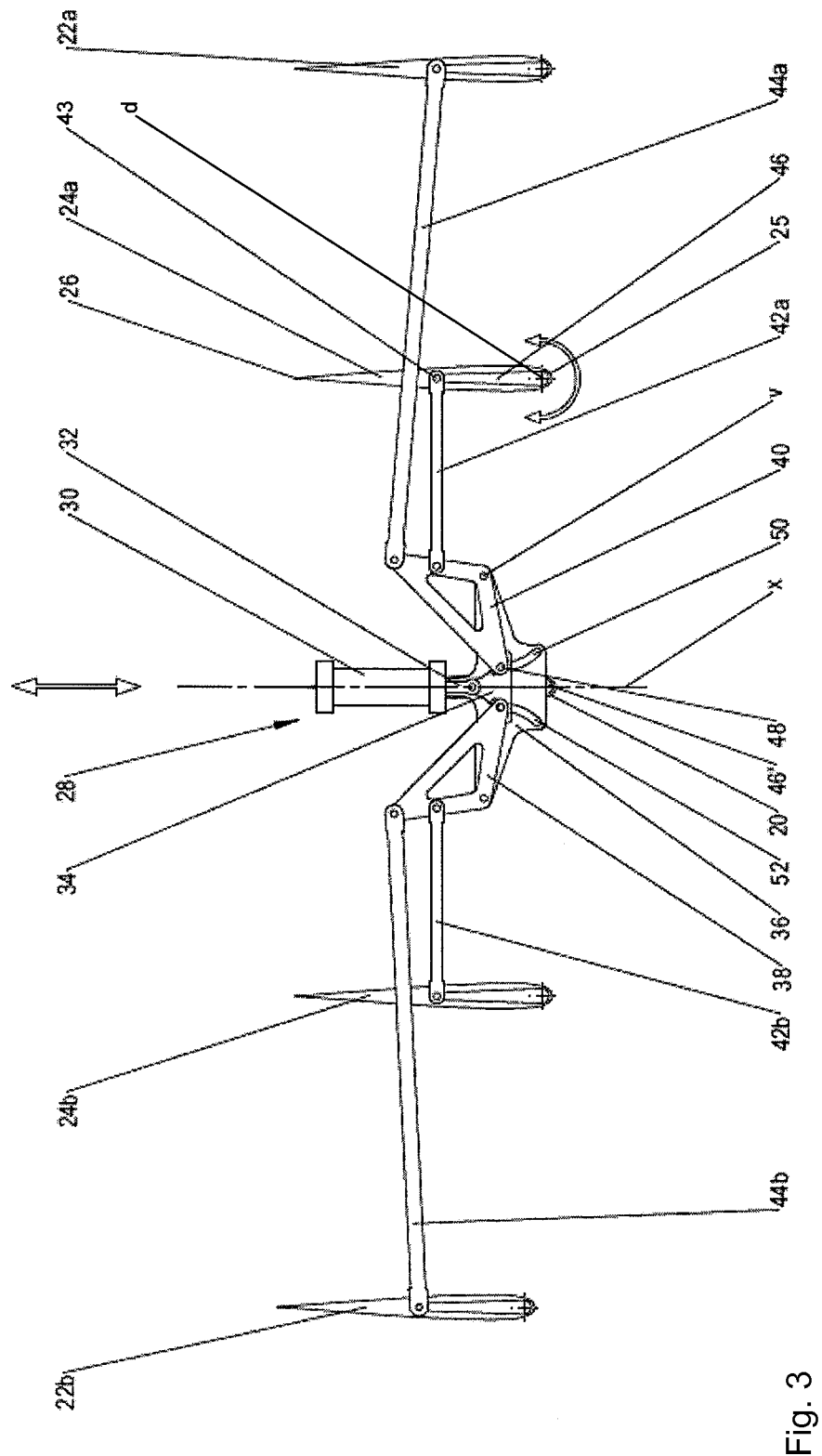
FIG. 3 shows a top view of a flap system of the thrust deflecting device according to the present invention in a rest position.

As shown in FIG. 3, deflecting flaps 20, 22a, 22b, 24a, 24b are each mounted between baffle plates 14, 16 and are pivotable around a yaw axis or rotation axis d extending in the vertical direction. In particular, flap system 18 in the illustrated exemplary embodiment has one inner deflecting flap 20 recumbently on longitudinal axis x, two lateral outer deflecting flaps 22a, 22b as well as two lateral middle deflecting flaps 24a, 24b situated between inner deflecting flap 20 and outer deflecting flaps 22a, 22b. Deflecting flaps 20, 22a, 22b, 24a, 24b are spaced evenly apart in the transverse direction, the two outer deflecting flaps 22a, 22b effectively forming side walls of the box-like structure (see FIG. 2). Deflecting flaps 20, 22a, 22b, 24a, 24b each have a wing-like profile having a leading edge or front edge 25 and a trailing edge or rear edge 26. Two adjacent deflecting flaps 20, 24a or 20, 24b or 24a, 22a or 24b, 22b each delimit a rectangular outlet partial cross section. The sum of the outlet partial cross sections forms the aforementioned rectangular outlet cross section of thrust deflecting device 6 or aircraft engine 1.

To deflect or vectorize the thrust stream in the pitch direction, the box-like structure, which includes baffle plates 14, 16 and flap system 18, is pivotable around a pivot axis s running parallel to transverse axis y, as shown by the double arrow in FIG. 2.

For the purpose of planar adjustment of the thrust stream and thus to change the outlet cross section or outlet partial cross sections and to deflect the thrust stream in the yaw direction, thrust deflecting device 6 has an adjusting device 28 for adjusting deflecting flaps 20, 22a, 22b, 24a, 24b around their rotation axes d.

As shown in FIG. 3, adjusting device 28 has an actuator 30, which is translationally movable in the longitudinal direction, is connected to the motor drive and acts upon a sliding plate 34 via an axial rod 32. Sliding plate 34 is situated in an actuating housing 36 and is mechanically operatively connected to deflecting flaps, 20, 22a, 22b, 24a, 24b via lever mechanisms.

The two lever mechanisms for activating lateral deflecting flaps 22a, 22b, 24a, 24b each include a pivot body 38, 40, which are situated opposite longitudinal axis x and are mounted in actuating housing 36, pivotable around a vertical axis v, which extends parallel to rotation axes d. Pivot bodies 38, 40 each have a triangular shape, including two legs of equal length, of which one leg is situated outside actuating housing 36 (outer leg) and the other leg is situated inside actuating housing 36 (inner leg). Vertical axis v is located at the point of intersection of these two legs.

Two joint rods 42a, 42b, 44a, 44b on the outer legs of pivot bodies 38, 40 each extend to and are linked to one of lateral deflecting flaps 22a, 22b, 24a, 24b. For connecting joint rods 42a, 42b, 44a, 44b, deflecting flaps 22a, 22b, 24a, 24b each have one arm 46, which is fastened to a front deflecting flap area near leading edges 25 and extends downstream. In the illustrated exemplary embodiment, arms 46 extend to fulcrums 43 of joint rods 42a, 42b, 44a, 44b.

The inner leg of pivot bodies 38, 40 interacts with a guide pin 48 on the end. Guide pin 48 is guided in a guideway 50, 52 on the actuating housing side and extends through an aperture 54 of sliding plate 34, which is visible in FIG. 4. Guideways 50, 52 have a bow-shaped configuration, their convex sides facing each other.

A lever mechanism for activating inner deflecting flap 20 is not apparent in the illustrated top view. A joint rod gripping arm 46' of inner deflecting flap 20 is thus also not apparent in the illustrated top view.

During a translational movement of actuator 30 in the longitudinal direction, which is indicated by the straight double arrow in FIG. 3, sliding plate 34 is entrained, and pivot bodies 38, 40 are each pivoted around their vertical axis v. Depending on the direction of the translational movement of actuator 30, trailing edges 26 of lateral deflecting flaps 22a, 22b, 24a, 24b are rotated toward longitudinal axis x or rotated away from longitudinal axis x, as indicated by the curved double arrow. During a translational movement of actuator 30, lateral deflecting flaps 22a, 24a on one side are thus pivoted in the opposite direction from deflecting flaps 22b, 24b on the other side. The position of inner deflecting flap 20 remains unchanged. Adjusting trailing edges 26 in the opposite direction toward or away from longitudinal axis x reduces or increases the size of the outlet partial cross sections and thus adjusts the outlet cross section of thrust deflecting device 6.

Figure 4:
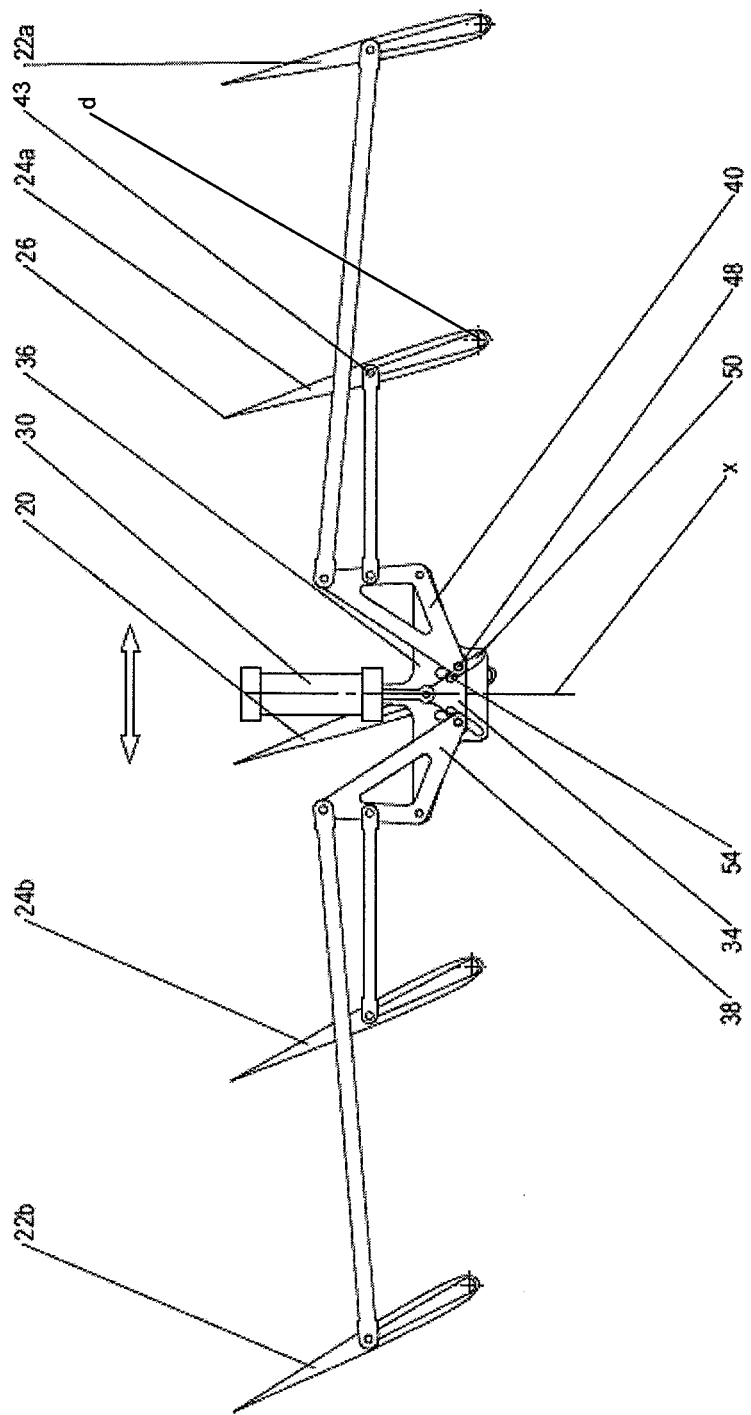
FIG. 4 shows a top view of the flap system in a working position.

To deflect or vectorize the thrust stream in the yaw direction, actuating housing 36 is translationally moved in the transverse direction, as indicated by the double arrow in FIG. 4. Due to the translational transverse movement of actuating housing 36, and thus of pivot body 38, 40, trailing edges 26 of all deflecting flaps 20, 22a, 22b, 24a, 24b are pivoted around their particular rotation axes d. Actuator 30 is entrained with sliding plate 34, due to its operative connection, a planar adjustment additionally taking place during the superimposition of this transverse movement by an actuator movement in the longitudinal direction.

A thrust deflecting device for deflecting a thrust stream is disclosed, which includes a flap system having a plurality of deflecting flaps, each of which is pivotable around its yaw axis, the flap system being situated between parallel control surfaces which, together with the flap system, form a box structure, which is pivotable around a pivot axis running in the direction of the transverse axis, an aircraft engine also being disclosed.

LIST OF REFERENCE NUMERALS

1 Aircraft engine
2 Jacket housing
4 Fan on the inlet side
6 Thrust deflecting device
8 Housing
10 Front housing section
12 Rear housing section
14 Baffle plate
16 Baffle plate
18 Flap system
20 Inner deflecting flap
22a, b Outer deflecting flap
24a, b Middle deflecting flap
25 Leading edge
26 Trailing edge
28 Adjusting device
30 Actuator
32 Axial rod
34 Sliding plate
36 Actuating housing
38 Pivot body
40 Pivot body
42a, b Joint rods
43 Fulcrums
44a, b Joint rods
46, 46' Arm
48 Guide pin
50 Guideway
52 Guideway
54 Aperture
d Rotation axis/yaw axis of the deflection flaps
m Aircraft engine center axis
s Pivot axis
v Vertical axis
x Longitudinal axis
y Transverse axis
z Yaw axis

What is claimed is:

1. A thrust deflecting device for deflecting a thrust stream of an aircraft engine, the thrust deflecting device comprising:
a housing of the aircraft engine;
a flap system having a plurality of deflecting flaps, each deflecting flap pivotable around a yaw axis extending orthogonally with respect to a transverse axis of the thrust deflecting device; and
two parallel baffle plates extending downstream from the housing, the flap system situated between the two parallel baffle plates, the two parallel baffle plates together with the flap system being pivotable around a pivot axis running in the direction of the transverse axis for the purpose of deflecting the thrust stream in a pitch direction.

2. The thrust deflecting device as recited in wherein the housing has a transition from a circular cross section to an angular outlet cross section.

3. The thrust deflecting device as recited in claim 1 wherein the deflecting flaps are situated evenly distributed on both sides of a longitudinal axis of the thrust deflecting device, and the deflecting flaps on one side are pivotable in the opposite direction from the deflecting flaps on the other side.

4. The thrust deflecting device as recited in claim 3 wherein adjustment of the deflecting flaps in the opposite direction takes place via a translational movement of an actuator.

5. The thrust deflecting device as recited in claim 4 wherein an adjustment of the deflecting flaps in the same direction takes place via a translational transverse movement of an actuating housing accommodating the actuator.

6. The thrust deflecting device as recited in claim 4 wherein the actuator is linked to a sliding plate movable in the actuating housing in the longitudinal direction and operatively connected to each of the deflecting flaps on one side via a lever mechanism, the lever mechanisms each including a pivot body pivotable around a vertical axis extending parallel to the yaw axis of the deflecting flaps, joint rods extending from the pivot body to each of the deflecting flaps.

7. The thrust deflecting device as recited in claim 6 wherein the joint rods are linked to arms extending downstream from a front area of the deflecting flaps.

8. An aircraft engine comprising the thrust deflecting device as recited in claim 1.

9. The thrust deflecting device as recited in claim 1 wherein the two parallel baffles plates are perpendicular to the plurality of deflecting flaps.

* * * * *